United States Patent Office 2,914,718
Patented Nov. 24, 1959

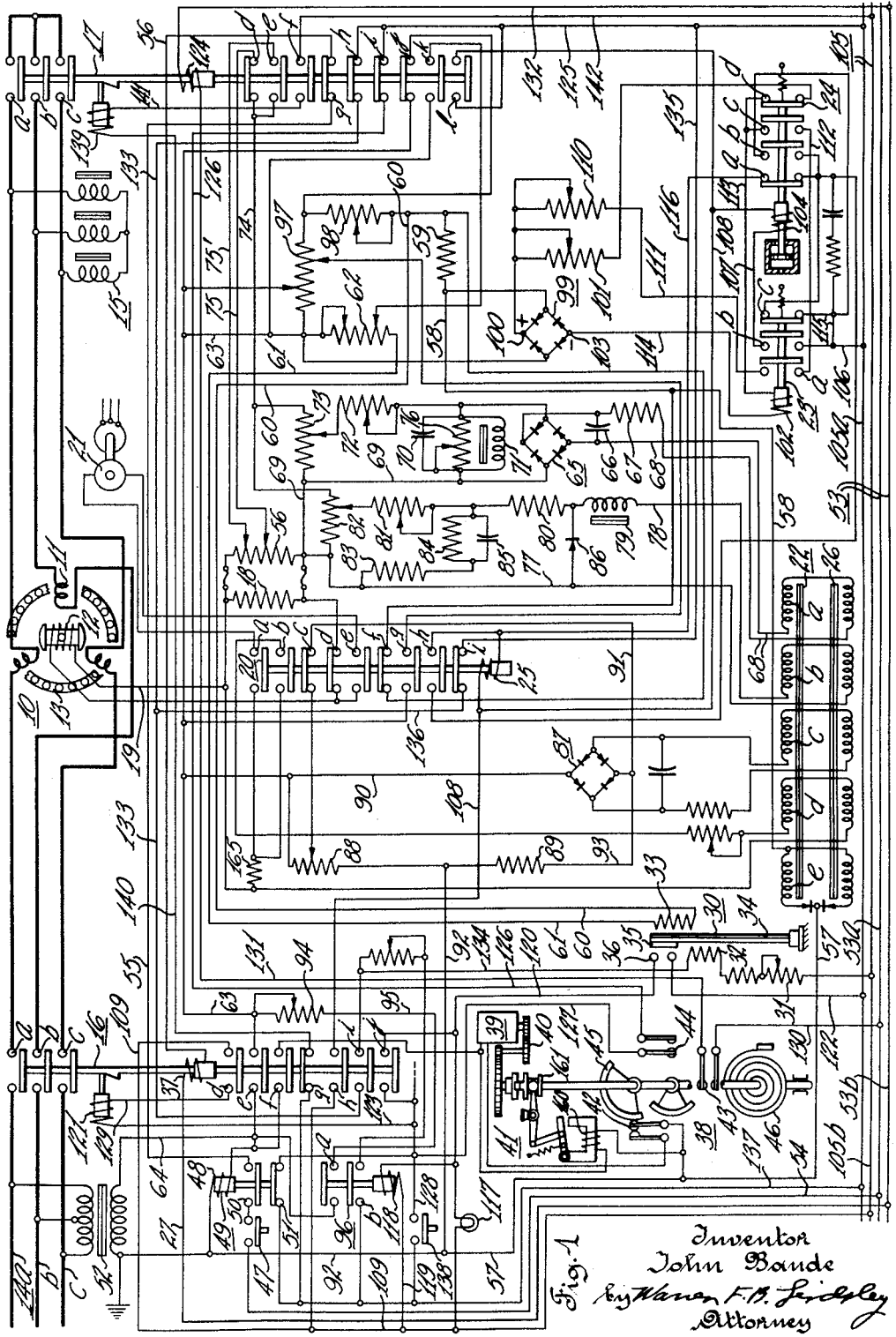

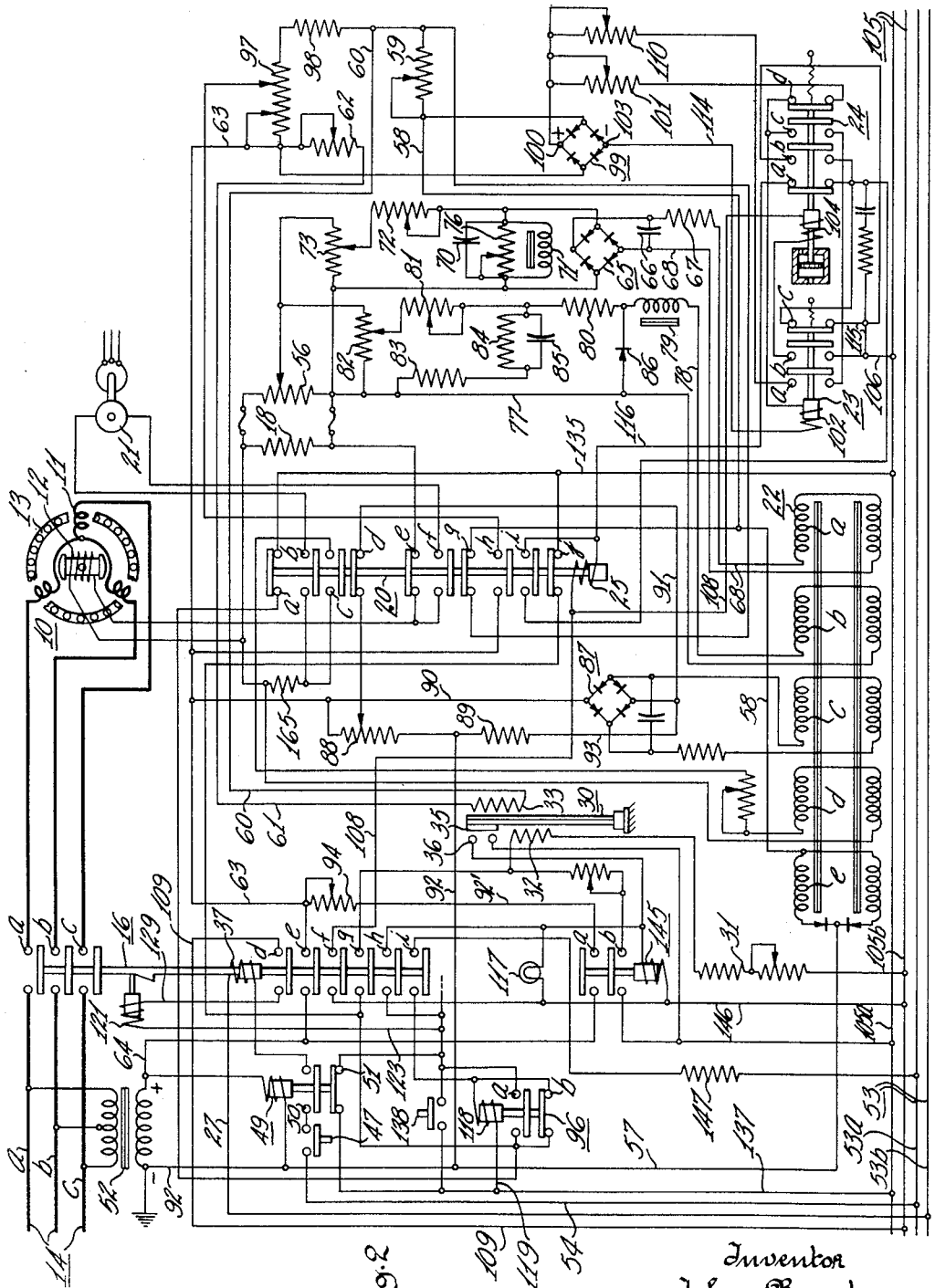

2,914,718

CONTROL SCHEME FOR ELECTRIC DEVICES EMPLOYING A MAGNETIC AMPLIFIER

John Baude, Milwaukee, Wis., assignor to Allis-Chalmers Manufacturing Company, Milwaukee, Wis.

Application January 14, 1957, Serial No. 633,884

16 Claims. (Cl. 318—167)

This invention relates to control arrangements and devices for electrical equipment and particularly to systems and devices for controlling the connections of alternating current motors so as to protect them against predetermined abnormal conditions. More particularly, this invention relates to dynamically and statically controlled magnetic amplifiers for protecting a secondary winding of an alternating current motor, such as a squirrel cage winding of a synchronous motor from becoming overheated by the currents induced therein when the motor is operating subsynchronously.

Heretofore, attempts have been made to protect synchronous motors by thermal relays which lock the motor out should synchronization fail to occur within a definite time after starting. The time characteristics of this type of relay had to be such that the motor would have time enough to start both at reduced voltage and at full voltage.

In order to improve the operating characteristics of systems and devices for operating electrical devices and particularly synchronous motors, a magnetic amplifier is used as a multipurpose relay. The new control scheme and device incorporating the magnetic amplifier provides the following protection for synchronous motors:

Protection against locked rotor conditions;
Cage winding protection during subsynchronous speeds;
Pull out protection;
Incomplete sequence protection;
Starting reactor overload protection;
Incomplete sequence backup protection; and
Proper application of excitation.

In general, a magnetic amplifier's static transfer characteristic is used for purposes of control signal amplification. Its time constant is kept small in order to make the phase angle between control signal current variations and gate current modulations as small as possible.

The magnetic amplifier's dynamic characteristics may also be employed for control purposes. In this case, the amplifier is purposely designed with a large time constant. The ratio of the square of the control winding turns to control circuit resistance in such an amplifier is relatively large. Its sensitivity to the usual causes for drift is less than the high speed statically controlled amplifier because its control performance is based primarily upon dynamic power gain. The dynamic control features of the self-excited amplifier are most apparent in the region of low gate current. The influence of supply voltage variation can be minimized by arranging control requirements in such a manner that the important operating range is located in the low gate current region and by proper bias control. In the dynamically controlled amplifier a frequency modulation or time varying voltage of the control signal may be used to obtain the desired gate or control output current modulation. Circuit simplicity, accuracy and versatility are the main features of a dynamically controlled magnetic amplifier.

Some of the factors which must be considered when a dynamically controlled amplifier is used as a control element are as follows:

Time available between the control impulse and the corresponding gate current response;
The ratio of control impulse change with time in frequency and/or amplitude, to the magnetic amplifier's response time. This ratio is a design factor and determines the frequency range at which gate current modulation is most effectively obtained;
Calibration and performance of the magnetic amplifier as influenced by the wave shape of the control voltage.

For the purposes of control signal comparison, more than one control signal winding may be used and various other control windings may be employed as bias control windings to shift the static transfer characteristic depending upon control signal frequency and/or supply voltage variations.

In accordance with this invention, new and improved control systems and devices are provided by which a relay's operation characteristics are changed on a coordinate basis with primary circuit breaker operation and motor speed to simulate the effect of motor terminal voltage variations and rate of cage winding heating with motor speed. A magnetic amplifier is used to control the relay depending upon the circuit breaker position and motor speed. These new and improved control arrangements and devices for starting synchronous machines are provided so that the relay and associated equipment are correlated with the rates of heating and cooling of a secondary winding, such as the cage winding of a synchronous motor to determine whether the motor control arrangement can respond to another motor starting operation.

It is, therefore, one object of this invention to provide a new and improved control device.

Another object of this invention is to provide a new and improved device for controlling a plurality of circuit breaker structures.

A further object of this invention is to provide a lockout arrangement which disconnects a synchronous machine from a source of power in case abnormal conditions existed during the starting period.

A still further object of this invention is to provide a new and improved control arrangement correlated with the connections of an alternating current motor so as to protect the motor against predetermined abnormal conditions.

A still further object of this invention is to provide a new and improved control arrangement for an alternating current motor in which the motor is deenergized in the event that the motor heats up and exceeds a predetermined temperature after starting power is applied, and in which the motor is maintained deenergized a length of time correlated with the rate of cooling of its secondary winding.

Another object of this invention is to provide a new and improved control arrangement for starting a synchronous motor in which the motor is protected against restarting unless its cage winding has cooled to a predetermined temperature.

Another object of this invention is to provide a new and improved control arrangement for starting a synchronous motor in which the anticipated temperature of the cage winding governs the number of motor starting operations with time.

Another object of this invention is to provide a new and improved control arrangement for closing a synchronous motor field circuit breaker at a predetermined point on a slip cycle current curve of the synchronous motor.

Objects and advantages other than those set forth will be apparent from the following descriptions when read in connection with the accompanying drawings, in which:

Fig. 1 is a detailed diagrammatic view of a synchronous motor, and a magnetic amplifier control device and reduced voltage starting arrangement therefor embodying the present invention; and Fig. 2 is a diagrammatic view of a synchronous motor, and a magnetic amplifier control device and full voltage starting arrangement therefor embodying the present invention.

Referring more particularly to the drawings by characters of reference, Fig. 1 illustrates an alternating current machine such as a synchronous motor 10 having an armature or primary winding 11, a field or secondary winding 12, and another secondary or squirrel cage winding 13. The synchronous motor 10 is connected to a suitable source 14 of current such as sixty cycle alternating current, indicated by conductors 14a, 14b and 14c through connections including a starting reactor 15 and circuit breakers 16 and 17, which may be referred to as starting and running breakers, respectively. The field winding 12 is connected in series with a field discharge resistor 18 in a circuit 19 by a normally closed contact 20d of a field contactor or breaker 20. An exciter 21 may be driven from synchronous motor 10 or may be driven, as shown, by a separate motor and is used for exciting the field winding 12. The field winding 12 is connected to and disconnected from the exciter 21 by means of contacts 20a and 20d of the field contactor or breaker 20. Contactor 20 is controlled by means of a magnetic amplifier 22 which controls relays 23, 24, 30 and in turn a coil 25 of contactor 20 and a relay 49 associated with breaker 16.

The magnetic amplifier 22 comprising a plurality of windings 22a, 22b, 22c, 22d and 22e inductively coupled to a core 26, controls the operation of motor 10 through relays 23, 24, 30, 38 and circuit breakers 16, 17 and contactor 20, and a plurality of circuit controlling elements such as condensers, resistors, rectifiers, coils, etc., which will be identified by reference characters during the detailed description of the operation of the circuits.

For protecting the starting reactor 15 of synchronous motor 10 from overheating during times of excessive starting duty, a heat responsive element or thermal relay 30 is provided. This thermal relay 30 is useful also for protecting the starting or cage winding 13 of machine 10 from overheating due to overloads or unsuccessful starts, pull outs, and too frequent starts. The protection afforded by relay 30 is based upon correlated time characteristics of relay 30 in connection with magnetic amplifier control for simulating heating and cooling of the cage winding 13 of motor 10.

Thermal relay 30 comprises a current adjusting resistor 31, a first heater 32, a second heater 33, a bimetallic element 34, a movable contact 35 mounted on the movable end of the bimetallic element 34 and stationary contacts 36.

A motor driven transfer or timing device 38 is used to control the operation of circuit breakers 16, 17 and synchronous motor 10 and comprises a motor 39, a gear train 40, an electromagnetic relay 41, contacts 42, 43 and 44, cams or other suitable contact actuating means 45, and a timing device reversing spring 46.

In accordance with the invention claimed, the control system functions as follows when assuming that the motor 10 is at a standstill and a starting pushbutton switch 47 is closed. Switch 47 may be automatically opened or closed by predetermined conditions on the power line 14 as well known in the art. Coil 48 of relay 49 holds contacts 50 closed and contacts 51 open whenever circuit 14 is energized through the potential supplied to coil 48 from the step down potential transformer 52. Current flows from conductor 53a of a direct current source 53 through conductor 54, pushbutton switch 47, contacts 50 of relay 49, conductor 55, contacts 17g of breaker 17, conductor 56, closing coil 37 of starting breaker 16, conductor 27 to conductor 53b of the direct current source 53. The energization of the closing coil 37 of starting breaker 16 causes breaker 16 and more particularly contacts 16a, 16b, 16c and 16e among others to close. Upon the closure of contacts 16a, 16b and 16c, motor 10 starts to rotate. The cage winding 13 and the reactor 15 start to heat up under the influence of the current induced in the cage winding and in the field winding of motor 10. The frequency of these currents called slip frequency, is the same in both windings and gradually decreases as the motor speeds up. The intensity of the cage winding current gradually decreases in time and the heating of the cage winding is roughly the same during each cycle of slip frequency current.

Upon the closure of the starting breaker 16 a current flows from one terminal of the potential transformer 52 through conductors 92 and 57, contacts 42 of timing device 38, motor 39, contacts 16f of breaker 16 to the other terminal of the potential transformer 52. Current also flows from one side of the potential transformer 52 through conductors 92 and 57, coil 160 of a clutch 161 through contacts 16f of breaker 16 and back to the other terminal of the potential transformer 52. This circuit energizes clutch 161 which causes the engagement of the gear train 40 and the contact actuating means 45. The gear train 40 rotates the contact actuating means 45 counterclockwise against the action of the spring biasing means 46. After a predetermined rotation of motor 39 and of the contact actuating means 45 the timer 38 closes its contact 43 and current then flows from conductor 53a of source 53 through conductor 130, contacts 43 of timer 38, conductor 131, closing coil 124 of breaker 17, conductor 132 to conductor 53b of source 53. Upon the energization of closing coil 124 the running breaker 17 closes its contacts 17a, 17b and 17c, thereby short circuiting the reactor 15. Motor 10 and particularly primary winding 11 is put under the influence of the full supply voltage and cage winding 13 then heats up at an increased rate.

Current induced in the field winding 12 of motor 10 is circulated through a closed circuit comprising the field winding 12, contacts 20d of field contactor 20 and resistor 18. A voltage is picked up across the resistor 18 by means of a tapped resistor 56 either through normally closed contacts 17d or 17e of breaker 17 depending on whether breaker 17 is open or closed.

At the moment of start of the motor 10 the output of the load or gate winding 22e of the magnetic amplifier is controlled by the combined ampere turns of the signal bias control winding 22a, the signal control winding 22b and the control bias winding 22c. It is noted that at the moment of starting, winding 22d is not energized. The load winding 22e is energized by the voltage appearing across the potential transformer 52 through conductors 92 and 57, winding 22e of magnetic amplifier 22, conductor 58, resistor 59, conductor 60, heater 33, conductor 61, resistor 62, conductor 63, contacts 16e of breaker 16 and conductor 64 to potential transformer 52.

The signal bias control winding 22a is energized from the full wave rectifier 65 which has in parallel therewith a capacitor 66 to smooth out the ripple of the rectified current and a resistor 67 in series through conductors 68. The voltage applied to rectifier 65, which may be a germanium diode, is derived from resistor 56 through a conductor 69, a frequency sensitive circuit containing a capacitor 70 in parallel with a choke coil 71, resistors 72 and 73, conductor 74, contacts 17d or 17e of breaker 17 and conductor 75 or 75', respectively. Resistor 76 may be added in parallel with capacitor 70 and choke coil 71 in order to modify to a desired degree the resonance characteristic of that circuit. This frequency sensitive circuit is tuned to slightly above power line frequency so that it is equivalent to a high impedance when the slip frequency of the current induced in the field winding is large (toward 60 cycles) and equivalent to a small impedance when the slip frequency is reduced. That means that the voltage across the terminals of this resonant or frequency sensitive circuit is large at the moment of start and diminishes gradually as motor 10 picks up speed. This voltage is applied to rectifier 65 which energizes the signal bias control winding 22a of magnetic amplifier 22. The effect of this control is to provide a maximum output of the magnetic amplifier 22 in the load circuit 22e at the moment of starting motor 10.

On the other hand, the signal control winding 22b of magnetic amplifier 22 has also a frequency sensitive contribution to the control of the magnetic amplifier output but of opposite polarity in respect to that of winding 22a.

The exciting voltage for winding 22b is essentially supplied from tapped resistance 56 in a loop circuit comprising conductor 77, winding 22b, conductor 78, reactor 79, resistor 80, resistor 81, resistor 82, conductor 74, contacts 17d or 17e of breaker 17 and conductor 75 or 75', respectively. Resistors 83, 84, capacitor 85 and rectifier 86 are connected across winding 22b to control its exciting voltage. The magnetic amplifier's output at low frequency, that is at speeds of motor 10 close to synchronism, is affected primarily by the ampere turns of winding 22b. The combination of the ampere turns of opposite polarity of windings 22a and 22b has also the effect of compensation to a certain extent for variations of the current in the discharge resistor 18.

Control bias winding 22c of magnetic amplifier 22 is permanently energized from the potential transformer 52 through a full wave rectifier 87. The voltage applied to rectifier 87 is obtained either from an adjustable resistor 88 (through the normally closed contacts 20c of contactor 20 as long as the closing coil 25 or contactor 20 is not energized) or directly through resistor 89 after contacts 20c open. As it will be seen later, this contact opens when D.C. excitation is applied. The circuit for energizing rectifier 87 from potential transformer 52 comprises conductor 64, contacts 16e of breaker 16, conductor 63, conductor 90, rectifier 87, conductor 91, contacts 20c of contactor 20, resistor 88 and conductor 92 to the other terminal of potential transformer 52. After contacts 20c of contactor 20 open, rectifier 87 is energized by transformer 52 through conductor 64, contacts 16e of breaker 16, conductor 63, conductor 90, rectifier 87, conductor 93, resistor 89 and conductor 92. In a special case, which will be described later when contacts 16e of breaker 16 are open, a bypass circuit is provided from rectifier 87 through conductors 90 and 63, resistor 94, conductor 95, contacts 96a of relay 96 to one side of transformer 52.

Obviously, the contribution of winding 22c of amplifier 22 does not depend on slip frequency and is constant as long as the power line voltage remains constant. Its ampere turns provide a means for adjusting the net output of the magnetic amplifier 22 at the moment of start of motor 10 to the desired value necessary for the operation of thermal relay 30. At the same time, due to the polarity of winding 22c in respect to the polarity of load winding 22e and signal bias winding 22a, winding 22c provides a certain compensation for variations between certain limits, in the power line voltage.

The circuit of the load winding 22e of the magnetic amplifier 22 is in the secondary circuit of transformer 52. This circuit is completed at the moment of starting of motor 10 through contacts 16e of breaker 16. In this circuit the voltage applied to a full wave rectifier 99 is taken from a resistance network containing resistors 97, 98, 59 and 62 around the time delay bimetallic device 30.

The rectified current flows from the positive terminal 100 of rectifier 99 through a resistor 101, the normally closed contacts 24d of relay 24, coil 102 of relay 23 to the negative terminal 103 of rectifier 99. Relay 23 is energized practically at the moment of start of motor 10. Upon the energization of coil 102 of relay 23, contacts 23b close and energize coil 104 of relay 24 from a conductor 105a of an alternating current or direct current source 105 through a conductor 106, contacts 23b of relay 23, conductor 107, coil 104 of relay 24, conductor 108, contacts 16h of breaker 16, conductor 109 and back to conductor 105b of power supply 105. As soon as the normally closed contacts 24d are opened and contacts 24c of relay 24 closed coil 102 of relay 23 continues to be energized but through resistor 110 and contacts 23a and 24c instead of resistor 101 and contacts 24d. This latter circuit comprises terminal 100 of rectifier 99, resistor 110, conductor 111, contacts 23a of relay 23, conductor 112, contacts 24c of relay 24, conductor 113, coil 102 of relay 23, conductor 114 to terminal 103 of rectifier 99. When the proper conditions for application of D.C. excitation are met, the output of the magnetic amplifier 22 is such that relay 23 is deenergized and the contacts thereof return to the position shown in Fig. 1. When contacts 23c are closed, coil 25 of contactor 20 is energized from conductor 105a of power supply 105 through conductor 106, conductor 115, contacts 24a, conductor 116, coil 25 of contactor 20, conductor 108, contacts 16h of breaker 16 and conductor 109 to conductor 105b of power supply 105.

Coil 25 is sealed in through contacts 20h of contactor 20. When relay 23 is deenergized, contacts 23b open and contacts 23c close before the now deenergized relay 24 opens its time delay contacts 24b. The final result is that after the excitation is applied to motor 10 from the D.C. exciter 21 through contacts 20d and 20a of contactor 20, relay 23 is in a deenergized condition similar to its initial condition and ready to repeat again its function operating procedure.

At the same time that the application of D.C. excitation from exciter 21 is applied to motor 10, contacts 20d of contactor 20 open, thereby interrupting the current flow through discharge resistor 18 and consequently the signal bias control winding 22a and signal control winding 22b of magnetic amplifier 22 are deenergized.

At the same time contacts 20c open and consequently the control bias winding 22c is energized through resistor 89 as previously described. Similarly, contacts 20f open and 20g close so that the network around relay 30 is modified according to the requirements in the load circuit 22e after the application of excitation to motor 10 from exciter 21. These requirements include pull out and field failure protection as well as protection against overheating due to repeated restarting operations. The network around thermal relay 30 allows a certain small current through this relay which prevents a too fast cooling action thereby simulating motor 10 cooling action.

The output current of the magnetic amplifier 22 is controlled during the period of motor operation by the control bias winding 22c energized through resistor 89 and winding 22d energized from the exciter 21 through contacts 20a of contactor 20 as previously described. As noted from Fig. 1 of the drawings, as long as contacts 35, 36 of the bimetallic thermal relay 30 are closed (indicated by the circuit through lamp 117) the coil 118 of relay 96 is energized by current flow from conductor 105b, conductor 109, conductor 119, coil 118 of relay 96, conductor 120, contacts 35, 36 of relay 30, conductor 122 to conductor 105a. Upon energization of coil 118 of relay 96 a reduced heating current will flow through the load circuit of the magnetic amplifier from the potential transformer 52 through conductor 64, contacts 96a of relay 96, conductor 95, resistor 94, conductor 63, resistor 62, conductor 61, heater 33 of relay 30, conductor 60, resistor 59, conductor 58, gate or load winding 22e of amplifier 22 and conductors 57 and 92 to potential transformer 52.

The result of this arrangement is that a reset is not possible before the adequate cooling of relay 30 and consequently of motor 10 is accomplished. If an attempt to restart motor 10 is made before it has cooled sufficiently by closing switch 47, a trip coil 121 of breaker 16 will be energized and breaker 16 will open. This is accomplished by closing switch 47 and in turn breaker 16. Upon closure of breaker 16 trip coil 121 of breaker 16 is energized from conductor 105 through conductor 122, contacts 35, 36 of relay 30, conductor 120 contacts 16j of breaker 16, conductor 123, trip coil 121 of breaker 16, contacts 16d of breaker 16, conductor 109 to conductor 105b of the power supply 105.

As far as the network around the thermal relay 30 is concerned, it is to be noted that a special arrangement is made to take into consideration the presence of the starting reactor 15. When full voltage is applied to motor 10 by energizing a breaker closing relay 124 of breaker 17 after motor 10 has reached a predetermined speed, contacts 17j and 17k of breaker 17 open and close, respectively. Opening and closing of contacts 17j and 17k of breaker 17 change the amount of resistance in the circuit in such manner that the current flow through thermal relay 30 is adjusted in coordination with the increased terminal voltage to the motor due to the short circuit around the reactor 15. If motor 10 does not complete its normal starting sequence in a predetermined time trip coil 121 is energized to trip the breaker 16 open by the closing of contacts 44 of the time delay relay 38. Current flows from line 105a through conductor 125, contacts 17i of breaker 17, conductor 126, contacts 44 of timing device 38, conductor 127, conductor 128, conductor 123, trip coil 121 of breaker 16, conductor 129, contacts 16d, conductor 109 to the source of power 105b thereby energizing trip coil 121 to open breaker 16 and shut down motor 10 after timing relay 38 has counted out a predetermined time.

The thermal relay 30 will also be energized and lead to the tripping of breaker 16 if closing relay 25 of contactor 20 or closing relay 124 of breaker 17 are not properly energized. Closing relay 124 governs the use of the starting reactor 15 and is energized from conductor 53a of the source of power 53 through conductor 130, contacts 43 of timing device 38, conductor 131, closing relay 124 of breaker 17, conductor 132 to the power line 53b of the source of power 53. If the normally closed contacts 17h of breaker 17 are not opened in due time, in other words, if full voltage is not applied to motor 10 after a specified time, the thermal relay 30 will close its contacts 35 and 36 and trip the breaker 16 as previously described. That is, relay 30 is energized from conductor 105a of power supply 105 through conductor 125, contacts 17h of breaker 17, conductor 133, contacts 16i of breaker 16, conductor 134, resistors 32 and 31 associated with thermal relay 30 to conductor 105b of power supply 105. Similarly, if closing relay 25 of contactor 20 is not energized in due time, the circuit extending from conductor 105a of power supply 105 through conductor 125, conductor 135, contacts 20i of contactor 20, conductor 136, conductor 133, contacts 16i of breaker 16, resistors 32 and 31 associated with thermal relay 30 to conductor 105b of power supply 105 is completed. In this way starting reactor protection and additional incomplete sequence protection is provided.

By means of the normally closed contacts 51 of relay 49 a similar circuit is obtained from conductor 105a of power supply 105 through conductor 137, contacts 51 of relay 49, conductor 128, conductor 123, trip coil 121 of breaker 16, contacts 16d of breaker 16 and conductor 109 to conductor 105b of source 105 if the output voltage of potential transformer 52 falls below a predetermined value.

The normal trip operation of breaker 16 to shut down motor 10 is assured by means of switch 138 through a circuit from power conductor 105a of power supply 105 through conductor 137, switch 138, conductor 128, conductor 123, trip coil 121 of breaker 16, conductor 129, contacts 16d of breaker 16, conductor 109 to conductor 105b of power supply 105.

A further arrangement is provided to prevent the time delay operation of the closing relay coil 124 of breaker 17 if for any reason the main breaker 16 did not close. Trip coil 139 of breaker 17 is energized from conductor 105a of the power source 105 through conductor 137, contacts 16g of breaker 16, conductor 140, trip coil 139 of breaker 17, conductor 141, contacts 17f of breaker 17, conductor 142 to conductor 105b of the power source 105. In this way, the presence of the starting reactor is assured in the circuit if breaker 16 is not closed.

Fig. 2 illustrates a modification of the control arrangement shown in Fig. 1. This modification illustrates a full voltage starting arrangement wherein the same reference characters have been used as in Fig. 1 for similar elements. Motor 10 is started by closing switch 47 which energizes the closing coil 37 of circuit breaker 16 with direct current from conductor 53a of the source of supply 53 through conductor 54, switch 47, contacts 50 of relay 49, closing coil 37 of circuit breaker 16, conductor 27 to conductor 53b of the source of supply 53. This completed circuit is possible due to the fact that the potential transformer 52 was already energized prior to the starting operation of motor 10 providing only that power in lines 14 is available. Consequently, relay 49 is continuously energized and its contacts 50 are initially closed. By energizing closing coil 37 of breaker 16, breaker 16 closes including contacts 16a to 16i, inclusive. One of the circuits connected across potential transformer 52 extends from the ground or negative side of the secondary winding of transformer 52 through conductors 92 and 57, winding 22e of the magnetic amplifier 22, conductor 58, resistor 59, conductor 60, resistor 33 of thermal relay 30, conductor 61, resistor 62, conductor 63, contacts 16e of breaker 16, conductor 64 to the other or positive terminal of the potential transformer 52. When circuit breaker 16 closes, current will flow through the windings of synchronous motor 10. At the same time induced current will appear in the field winding 12 and cage winding 13 of motor 10. Since contact 20e of contactor 20 is normally closed the field current of motor 10 will flow through the discharge resistor 18. This induced current has a frequency which depends on the rotating speed of the rotor of motor 10, and at zero speed of the motor has line frequency, namely, sixty cycles. As the motor gains speed, the frequency is gradually reduced to almost zero cycles, i.e., synchronism.

At the moment of start of motor 10 the output of the load circuit 22e of the magnetic amplifier is controlled by the combined ampere turns of signal bias control winding 22a, signal control winding 22b and control bias winding 22c. It is to be noted that at the moment of start of motor 10 winding 22d is not energized since contacts 20b and 20c of contactor 20 are normally open.

Signal bias control winding 22a is energized from the full wave rectifier 65 which has in parallel with it a capacitor 66 to smooth out the ripples of the rectified current and in series with it a resistance 67. The voltage applied to rectifier or diode 65 is derived from resistor 56 connected across resistor 18 through the frequency sensitive circuit containing capacitor 70 in parallel with choke coil 71 and the additional parallel resistance 76, if required, through resistances 72 and 73. This resonant circuit is tuned to slightly above power line frequency so that it is equivalent of a high impedance when the slip frequency of the current induced in the field winding is large (toward sixty cycles) and equivalent to a small impedance when the slip frequency is reduced. That means that the voltage across the terminals of this resonant circuit is large at the moment of start and diminishes gradually as the motor picks up speed. This voltage is applied to rectifier or diode 65 which energizes the signal bias control winding 22a through conductors 68. The effect of this control is to provide a maximum output of the magnetic amplifier 22 in the load circuit 22e at the moment of start of motor 10.

On the other hand, the signal control winding 22b of magnetic amplifier 22 has also a frequency sensitive contribution to the control of the magnetic amplifier output but of opposite sign in respect to that of winding 22a. The exciting voltage is essentially supplied from the tapped resistance 56 in parallel with a loop containing the capacitor 85 and resistances 82, 83 and 84 and in series with resistances 80 and 81. A rectifier 86 and reactor 79 are provided to stabilize the circuit and reduce the harmonics. Conductors 77 and 78 interconnect these elements in a loop circuit across winding 22b of amplifier 22. The magnetic amplifier output at low frequency, that is, at speeds close to synchronism, is affected primarily by the ampere turns of this winding 22b. The combination of the ampere turns of opposite signs of windings 22a and 22b of magnetic amplifier 22 has also the effect of compensating to a certain extent for variations of the current in the discharge resistor 18.

The control bias winding 22c of magnetic amplifier 22 is permanently energized from the potential transformer 52 through the full wave rectifier 87. The voltage applied to this rectifier is obtained either from the adjustable resistor 88 through the normally closed contacts 20d of contactor 20 as long as relay 25 of contactor 20 is not energized or directly through resistor 89 after contacts 20d have opened. As it will be seen later, these contacts open when direct current excitation is applied to magnetic amplifier 22. In the first case the circuit extends from the positive terminal of the potential transformer 52 through conductor 64, contacts 16e of circuit breaker 16, conductor 63, conductor 90, rectifier 87, conductor 91, contacts 20d of contactor 20, resistor 88, conductor 92, to the negative terminal of the potential transformer 52. In the second case, the circuit extends from the positive terminal of potential transformer 52 through conductor 64, contacts 16e of circuit breaker 16, conductor 63, conductor 90, rectifier 87, conductor 93, resistor 89, conductor 92 to the negative terminal of the potential transformer 52. In a special case described later when contacts 16e of breaker 16 are open, a bypass circuit is provided through contacts 145a of relay 145 and resistor 94.

Obviously, the contribution of winding 22e does not depend on slip frequency and is constant as long as the power line 14 voltage remains constant. Its ampere turns provide a means for adjusting the net output of the magnetic amplifier 22 at the moment of start of motor 10 to the desired value necessary for the operation of relay 30. In the same time, due to its sign in respect to load winding 22e and signal bias winding 22a, winding 22c provides a certain compensation for variations between certain limits in the power line voltage.

The circuit of the load winding 22e of the magnetic amplifier 22 is in the secondary of the potential transformer 52. It is completed at the moment of start of motor 10 through contacts 16e of circuit breaker 16. In this circuit, the voltage applied to the full wave rectifier 99 is taken from a resistance network containing resistors 59, 98, 97 and 62 around the time delay device 30. The rectified current flows from the positive terminal 100 of rectifier 99 through resistor 101, normally closed contacts 24d, coil 102 of relay 23 to the negative terminal 103 of rectifier 99. Thus, relay 23 is energized practically at the moment of start of motor 10 and contacts 23b close. Since contacts 16h were closed from the start of motor 10 current flows from conductor 105a of the source 105 through conductor 106, contacts 23b, coil 104 of relay 24, conductor 108, contacts 16f, conductor 146 to conductor 105b of source 105. As soon as the normally closed contacts 24d of relay 24 open and contacts 24c close upon energization of coil 104, coil 102 of relay 23 continues to be energized from rectifier 99 but through resistor 110, contacts 23a of relay 23, and contacts 24c of relay 24, coil 102 of relay 23, conductor 114 to the negative terminal 103 of rectifier 99.

When the proper conditions for application of direct current excitation are met, the output of the magnetic aplifier 22 is such that coil 102 of relay 23 is deenergized. When this occurs, contacts 23c are closed and relay 25 of contact 20 is energized from conductor 105a of source of supply 105, conductor 106, conductor 115, contacts 23c of relay 23, contacts 24a of relay 24, conductor 116, relay 25 of contactor 20, conductor 108, contacts 16f of circuit breaker 16, conductor 146 to conductor 105b of the source of supply 105. Relay 25 of contactor 20 is sealed in through contacts 20i of contactor 20. When coil 102 of relay 23 is energized contacts 23c open and contacts 23b close before the now deenergized relay 24 opens its time delay contacts 24b. The final result is that after excitation is applied to motor 10 from the exciter 21 through contacts 20b and 20f of contactor 20, relay 23 is in a deenergized condition similar to its initial state and ready to repeat its function.

With the application of direct current excitation to motor 10, the normally closed contacts 20e of contactor 20 open. Hence, current no longer flows through discharge resistor 18 and consequently the signal bias control winding 22a and signal control winding 22b of magnetic amplifier 22 are deenergized. Further, contacts 20d of contactor 20 open and control bias winding 22c of magnetic amplifier 22 is energized through resistor 89 as previously described. Similarly, contact 20g opens and contacts 20h close so that the network around thermal relay 30 is modified according to the requirements in the load circuit 22e of magnetic amplifier 22 after the application of direct current excitation to winding 12 of motor 10. These requirements include pullout and field failure protection as well as protection against overheating due to eventually repeated restarting operations of motor 10.

The network around thermal relay 30 allows a predetermined low value current to flow through relay 30 to prevent a too fast cooling of its bimetallic element 34. The output current of magnetic amplifier 22 is controlled during this period of operation by the control bias winding 22c through resistor 89 and winding 22d which is energized from the excitation circuit through contacts 20c as previously mentioned. It can be seen that as long as contacts 35 and 36 of relay 30 are closed, relay 145 is energized from conductor 105b of power supply 105 through conductor 146, the coil of relay 145, contacts 35 and 36 of relay 30, to conductor 105a of power supply 105, and a cooling current will then flow through the load circuit of the magnetic amplifier from the positive terminal of the potential transformer 52 through conductor 64, contacts 145a of relay 145, conductor 92', resistor 94 which bypasses contacts 16e of breaker 16, conductors 63 and 90 to rectifier 87 even if breaker 16 is open. The result of this arrangement is that a reset of relay 30 is not possible before adequate cooling of the bimetallic strip 34 of relay 30 and consequently, of motor 10 has occurred. If an attempt to start motor 10 is made by closing switch 47, the trip coil 121 of breaker 16 will be energized and breaker 16 will open. When switch 47 is closed, breaker 16 will close and immediately thereafter trip coil 121 of breaker 16 will be energized from conductor 105a of the source 105 through contacts 35 and 36 of relay 30, contacts 16h of breaker 16, conductor 123, closing coil 121 of breaker 16, conductor 129, contacts 16d of breaker 16, conductor 109 to conductor 105b of source 105.

Relay 30 will be energized and lead in a similar way to the tripping of breaker 16 also if relay 25 of contactor 20 is not properly energized. Current flows through time delay relay 30 as long as normally closed contacts 20j of contactor 20 and contacts 16g of breaker 16 are closed. Time delay relay 30 is energized under these conditions from conductor 105a of source 105 through conductor 135, contacts 20j of contactor 20, contacts 16g of breaker 16, resistor 32 of time delay relay 30, resistor 31 to conductor 105b of source 105. Relay 96 is short circuited through contacts 96a of relay 96 and contacts 20a of contactor 20 around time delay relay 30. If contactor 20 does not close in due time, time delay relay 30 will close its time delay contacts 35, 36 and breaker 16 will be tripped as previously described. In normal starting operations of motor 10 when the excitation is applied by contactor 20, contacts 20j of contactor 20 open and relay 96 is no longer short circuited but is energized from conductor 105a of source 105 through conductor 137, conductor 119, coil 118 of relay 96, contact 16i of breaker 16, resistor 147 to conductor 105b of source 105. Upon energization of coil 118 of relay 96, contacts 96a close and contacts 96b open. Then if for any reason such as pullout of motor 10 or failure of the D.C. source from exciter 21, contactor 20 is tripped open, contacts 20a close and the circuit from conductor 105a of source 105 through conductor 135, contacts 20a of contactor 20, contacts 96a of relay 96, conductor 123, tripping coil 121 of breaker 16, conductor 129, contacts 16d of breaker 16, conductor 109 to conductor 105b of source 105 is completed. Upon pullout of motor 10 a slip cycle frequency is introduced across resistor 165 which establishes a cycling action in the winding 22d of the magnetic amplifier 22 thereby disturbing the equilibrium of the control windings 22d and 22c in such manner that relay 23 is again energized to deenergize coil 25 of contactor 20 causing the latter to open.

The energization of tripping coil 121 opens breaker 16. If a reset procedure is desired instead of shutdown of motor 10, contacts 96a should be permanently open. In this way additional incomplete sequence protection and pullout protection are provided.

By means of normally closed contacts 51 of relay 49 a similar circuit is obtained from line 105a of source 105 through conductor 137, contacts 51 of relay 49, conductor 123, tripping coil 121, conductor 129, contacts 16d of breaker 16, conductor 109 to conductor 105b of source 105 if the voltage in the power line 105 is not high enough to keep relay 49 energized. In that case breaker 16 will again be tripped and motor 10 stopped.

The normal trip operation of breaker 16 and the shutdown of motor 10 is assured by means of tripping switch 138. The circuit through switch 138 extends from conductor 105a of source 105 through conductor 137, switch 138, conductor 123, trip coil 121 of breaker 16, conductor 129, contacts 16d of breaker 16, conductor 109 to conductor 105b of source 105.

In accordance with the invention claimed applicant has provided a new and improved control device comprising a magnetic amplifier having a plurality of windings. These windings are connected in circuits to control the operation of an electric device, such as for example, a synchronous motor in a predetermined manner. One of the windings of the amplifier usually called a gate current winding is affected by the current flow in the remaining windings. These remaining windings are each connected in control circuits which are connected across suitable sources of power, for example, either a direct current source or alternating current source of fixed or variable frequency. These control circuits which may comprise current amplifying devices are arranged to alternately increase and decrease the current flow in the gate current circuit in a predetermined manner in rhythmic response to the dynamic characteristics of the magnetic amplifier. The gate current flow in one of the windings of the magnetic amplifier affects actuation of one or more circuit breakers to control the operation of an electric device, for example, the synchronous motor or any other alternating current machine. A thermal relay, timing devices, etc., may be used and controlled by the circuit breakers to obtain the devised operation of the controlled electric device. As is noted from the description of operation of the structures shown in Figs. 1 and 2, one or more of the windings on the core of the magnetic amplifier may be used to modify the average value of current flow in the amplifier's gate current circuit to establish the range of operation of the magnetic amplifier, and at least one winding may be used to provide static control of the controlled electric device such as the synchronous motor after the period of dynamic and static control of the motor by the magnetic amplifier.

Although but two embodiments of the present invention have been illustrated and described, it will be apparent to those skilled in the art that various changes and modifications may be made therein without departing from the spirit of the invention or from the scope of the appended claims.

What is claimed is:

1. In combination, a circuit breaker connected to a source of electric power, a relay electrically connected to said breaker, means for closing said breaker to cause a first current to flow from said source through said breaker to said relay, means for opening said breaker, said opening means being actuated upon a predetermined cycle of current flow through said relay, a magnetic amplifier comprising first and second windings mounted on a magnetic core, said first winding being connected in series with said relay across said source of electric power, a control circuit, a source of variable frequency, said control circuit being electrically connected to said second winding across said source of variable frequency, said second winding affecting current flow in said first winding to alternately increase and decrease the current flow in said first winding in rhythmic response to the dynamic characteristics of said magnetic amplifier and thereby affecting actuation of said breaker.

2. In combination, a first circuit breaker connected to a source of electric power, a second circuit breaker connected to a source of electric power, a thermal relay electrically connected to said first breaker, relay means electrically connected to said second breaker for actuating said second breaker, means for closing said first breaker to cause a current to flow from said source through said first breaker to said relay means, said thermal relay and said relay means being responsive respectively to different predetermined cycles of current flow, a magnetic amplifier comprising first and second windings mounted on a magnetic core, said first winding being connected in series with said thermal relay and said relay means across said source, a control circuit, a source of variable frequency, said control circuit being electrically connected to said second winding across said source of variable frequency, said second winding affecting current flow in said first winding to alternately increase and decrease the current flow in said first winding in rhythmic response to the dynamic characteristics of said magnetic amplifier and thereby actuating said thermal relay and said relay means in a predetermined manner to control said first and second circuit breakers.

3. In combination, a first circuit breaker connected to a source of electric power, a second circuit breaker connected to a source of electric power, a first relay electrically connected to said first breaker, a second relay electrically connected to said second breaker for actuating said second breaker, means for closing said first breaker to cause a current to flow from said source through said first breaker to said second relay, said first relay and said second relay each being responsive respectively to different predetermined cycles of current flow, a magnetic amplifier comprising first and second windings mounted on a magnetic core, said first winding being connected in series with said first relay and said second relay being connected across said source, a control circuit, a source of variable frequency, said control circuit being electrically connected to said second winding across said source of variable frequency, said second winding affecting current flow in said first winding to alternately increase and decrease the current flow in said first winding in rhythmic response to the dynamic characteristics of said magnetic amplifier and thereby actuating said first relay and said second relay in a predetermined manner to control said first and second circuit breakers.

4. In combination, a first circuit breaker connected to a source of electric power, a second circuit breaker connected to a source of electric power, a thermal relay electrically connected to said first breaker, relay means electrically connected to said first breaker and said second breaker for actuating said second breaker, means for closing said first breaker to cause a current to flow from said source through said first breaker to said relay means, said thermal relay being responsive to a predetermined cycle of current flow, a magnetic amplifier comprising first and second windings mounted on a magnetic core, said first winding being connected in series with said thermal relay across said source of electric power, a control circuit, a source of variable frequency, said control circuit being electrically connected to said second winding across said source of variable frequency, said second winding affecting current flow in said first winding to alternately increase and decrease the current flow in said first winding in rhythmic response to the dynamic characteristics of said magnetic amplifier and to actuate said thermal relay to control the actuation of said first and second breakers in a predetermined manner.

5. In combination, a first circuit breaker connected to a source of electric power, a second circuit breaker connected to said source, a thermal relay electrically connected to said first and second breakers, relay means electrically connected to said second breaker for actuating said second breaker, means for actuating said first breaker to cause a first current to flow from said source through said first breaker to said relay means, said relay means upon actuation thereof causing a second current to flow from said source through said second breaker, said thermal relay being responsive to a predetermined cycle of current flow therethrough, a magnetic amplifier comprising first and second windings mounted on a magnetic core, said first winding being connected in series with said thermal relay across said source, a control circuit, a source of variable frequency, said control circuit being electrically connected to said second winding across said source of variable frequency, said second winding affecting current flow in said first winding to alternately increase and decrease the current flow in said first winding in rhythmic response to the dynamic characteristics of said magnetic amplifier and thereby actuating said thermal relay to control the operation of said first and second breakers in a predetermined manner.

6. In combination, a first circuit breaker connected to a source of electric power, a second circuit breaker connected to said source, a thermal relay electrically connected to said first and second breakers, said thermal relay being responsive to a predetermined cycle of current flow therethrough, relay means electrically connected to said second breaker, a first means for actuating said first breaker to cause a first current to flow from said source through said first breaker to said relay means, said relay means actuating said second breaker upon energization thereof, a magnetic amplifier comprising first and second windings mounted on a magnetic core, said first winding being connected in series with said thermal relay across said source of electric power, a control circuit, a source of variable frequency, said control circuit being electrically connected to said second winding across said source of variable frequency, said second winding affecting current flow in said first winding to alternately increase and decrease the current flow in said first winding in rhythmic response to the dynamic characteristics of said magnetic amplifier, said thermal relay under certain conditions of said current flow in said first winding causing said first breaker to open, and means responsive to the opening of said first breaker for connecting said thermal relay to said source to cause a second lower current to flow through said thermal relay to retard to a predetermined value the rate of cooling of said thermal relay.

7. In combination, a circuit breaker connected to a source of electric power, a thermal device electrically connected to said breaker, means for closing said breaker to cause a first current to flow from said source through said breaker to said device, means for opening said breaker, said closing means being responsive to a predetermined cycle of current flow therethrough, a magnetic amplifier comprising first and second windings mounted on a magnetic core, said first winding being connected in series with said closing means across said source of electric power, a control circuit, said control circuit being electrically connected to said second winding across said source, said source having a variable frequency, said second winding affecting current flow in said first winding to alternately increase and decrease the current flow in said first winding in rhythmic response to the dynamic characteristics of said magnetic amplifier, said device upon reaching a predetermined temperature actuating said opening means to open said breaker, and means responsive to the closing of said second breaker for connecting said relay to said source to cause a second lower current to flow through said relay to retard to a predetermined value the rate of cooling of said relay.

8. In combination, a first circuit breaker connected to a source of electric power, a second circuit breaker connected to a source of electric power, a first relay electrically connected to said first breaker, a second relay electrically connected to said second breaker for actuating said second breaker, means for closing said first breaker to cause a current to flow from said source through said first breaker to said second relay, said second relay being responsive to a predetermined cycle of current flow, a magnetic amplifier comprising first and second windings mounted on a magnetic core, said first winding being connected in series with said first relay, a control circuit, a source of variable frequency, said control circuit being electrically connected to said second winding across said source of variable frequency, said second winding affecting current flow in said first winding to alternately increase and decrease the current flow in said first winding in rhythmic response to the dynamic characteristics of said magnetic amplifier and thereby actuating said first relay and said second relay in a predetermined manner to control said first and second circuit breakers and means for selecting a predetermined cycle of current flow from said source of variable frequency and energizing said control circuit.

9. In combination, a first circuit breaker connected to a source of electric power, a second circuit breaker connected to a source of electric power, a first relay electrically connected to said first breaker, a second relay electrically connected to said second breaker for actuating said second breaker, means for closing said first breaker to cause a current to flow from said source through said first breaker to said second relay, said second relay being responsive to a predetermined cycle of current flow, a magnetic amplifier comprising first, second and third sets of windings mounted on a magnetic core, said first winding being connected in series with said first relay, a first control circuit, a source of variable frequency, said first control circuit being electrically connected to said second winding across said source of variable frequency, said second winding affecting current flow in said first winding to alternately increase and decrease the current flow in said first winding in rhythmic response to the dynamic characteristics of said magnetic amplifier and thereby actuating said first relay and said second relay in a predetermined manner to control said first and second circuit breakers, means for selecting a predetermined cycle of current flow from said source of variable frequency and energizing said first control circuit, and a second control circuit comprising a plurality of control circuit current amplifying devices, said second control circuit being electrically connected across said source of variable frequency for providing said third set of windings with substantially unidirectional current pulses, said third set of windings affecting current flow in said first set of windings to modify the average value of the current flow in said first set of windings substantially as a function of the frequency of said second control circuit.

10. In combination, a first circuit breaker connected to a source of electric power, a second circuit breaker connected to a source of electric power, a first relay electrically connected to said first breaker, a second relay electrically connected to said second breaker for actuating said second breaker, means for closing said first breaker to cause a current to flow from said source through said first breaker to said second relay, said first and second relays being responsive to predetermined cycles of current flow, a magnetic amplifier comprising first, second and third sets of windings mounted on a magnetic core, said first winding being connected in series with said first relay, a first control circuit, a source of variable frequency, said first control circuit being electrically connected to said second winding across said source of variable frequency, said second winding affecting current flow in said first winding to alternately increase and decrease the current flow in said first winding in rhythmic response to the dynamic characteristics of said magnetic amplifier and thereby actuating said first relay and said second relay in a predetermined manner to control said first and second circuit breakers, means for selecting a predetermined cycle of current flow from said source of variable frequency and energizing said first control circuit, and a second control circuit comprising a plurality of control circuit current amplifying devices, said second contol circuit being electrically connected across said source of variable frequency for providing said third set of windings with substantially unidirectional current pulses, said third set of windings affecting current flow in said first set of windings to modify the average value of the current flow in said first set of windings substantially as a function of the frequency of said second control circuit.

11. In combination, a first circuit breaker connected to a source of electric power, a second circuit breaker connected to a source of electric power, a first relay electrically connected to said first breaker, a second relay electrically connected to said second breaker for actuating said second breaker, means for closing said first breaker to cause a current to flow from said source through said first breaker to said second relay, said first and second relays being responsive to predetermined cycles of current flow, a magnetic amplifier comprising first, second, third and fourth sets of windings mounted on a magnetic core, said first winding being connected in series with said first relay, a first control circuit, a source of variable frequency, said first control circuit being electrically connected to said second winding across said source of variable frequency, said second winding affecting current flow in said first winding to alternately increase and decrease the current flow in said first winding in rhythmic response to the dynamic characteristics of said magnetic amplifier and thereby actuating said first relay and said second relay in a predetermined manner to control said first and second circuit breakers, means for selecting a predetermined cycle of current flow from said source of variable frequency ad energizing said first control circuit, and a second control circuit comprising a plurality of control circuit current amplifying devices, said second control circuit being electrically connected across said source of variable frequency for providing said third set of windings with substantially unidirectional current pulses, said third set of windings affecting current flow in said first set of windings to modify the average value of the current flow in said first set of windings substantially as a function of the frequency of said second control circuit, a third control circuit, said fourth set of windings being connected to said third control circuit across said source of power for establishing the range of operation of said magnetic amplifier.

12. In combination, a first circuit breaker connected to a source of electric power, a second circuit breaker connected to a source of electric power, a first relay electrically connected to said first breaker, a second relay electrically connected to said second breaker for actuating said second breaker, means for closing said first breaker to cause a current to flow from said source through said first breaker to said second relay, said first and second relays being responsive to predetermined cycles of current flow, a magnetic amplifier comprising first, second, third, fourth and fifth sets of windings mounted on a magnetic core, said first winding being connected in series with said first relay, a first control circuit, a source of variable frequency, said first control circuit being electrically connected to said second winding across said source of variable frequency, said second winding affecting current flow in said first winding to alternately increase and decrease the current flow in said first winding in rhythmic response to the dynamic characteristics of said magnetic amplifier and thereby actuating said first relay and said second relay in a predetermined manner to control said first and second circuit breakers, means for selecting a predetermined cycle of current flow from said source of variable frequency and energizing said first control circuit, a second control circuit comprising a plurality of control circuit current amplifying devices, said second control circuit being electrically connected across said source of variable frequency for providing said third windings with substantially unidirectional current pulses, said third windings affecting current flow in said first windings to modify the average value of the current flow in said first windings substantially as a function of the frequency of said second control circuit, a third control circuit, said fourth windings being connected to said third control circuit across said source of power for establishing the range of operation of said magnetic amplifier, and a fourth control circuit connected to said fifth windings and across said source of power for providing static control of said electric devices after the period of dynamic and static control of said electric devices by said amplifiers.

13. In combination, an alternating current machine having a primary winding and a secondary winding, a first circuit breaker connecting said primary winding to a source of electric power, a second circuit breaker connected to said secondary winding, a thermal relay electrically connected to said first breaker, a relay means electrically connected to said second breaker for actuating said second breaker, means for closing said first breaker to cause a current to flow from said source through said first breaker to said relay means, said thermal relay and said relay means being responsive to predetermined cycles of current flow, a magnetic amplifier comprising first and second windings mounted on a magnetic core, said first winding being connected in series with said thermal relay, a control circuit, said control circuit being electrically connected to said second winding across said secondary winding, said second winding affecting current flow in said first winding to alternately increase and decrease the current flow in said first winding in response to the characteristics of said magnetic amplifier, said thermal relay upon predetermined current flow therethrough controlling the actuation of said first breaker, said relay means upon predetermined energization thereof by said first winding controlling the current flow from said source through said thermal relay.

14. In combination, an alternating current machine having a primary winding and a secondary winding, a first circuit breaker connecting said primary winding to a source of electric power, a second circuit breaker connected to said secondary winding, a thermal relay electrically connected to said first breaker, a first relay means electrically connected to said second breaker for actuating said second breaker, means for closing said first breaker to cause a current to flow from said source through said first breaker to said relay means, said thermal relay and said relay means being responsive to predetermined cycles of current flow, a magnetic amplifier comprising first and second windings mounted on a magnetic core, said first winding being connected in series with said thermal relay, a control circuit, said control circuit being electrically connected to said second winding across said secondary winding, said second winding affecting current flow in said first winding to alternately increase and decrease the current flow in said first winding in rhythmic response to the dynamic characteristics of said magnetic amplifier under operation of said machine out of synchronism with said source, said thermal relay upon predetermined current flow therethrough controlling the actuation of said first breaker, said relay means upon predetermined energization thereof by said first winding controlling the current flow from said source through said thermal relay.

15. In combination, an alternating current machine having a primary winding and a secondary winding, a first circuit breaker connecting said primary winding to a source of electric power, a second circuit breaker connected to said secondary winding, a thermal relay electrically connected to said first breaker, a relay means electrically connected to said second breaker for actuating said second breaker, means for closing said first breaker to cause a current to flow from said source through said first breaker to said relay means, said thermal relay and said relay means being responsive to predetermined cycles of current flow, a magnetic amplifier comprising first, second and third windings mounted on a magentic core, said first winding being connected in series with said thermal relay, a first control circuit, said first control circuit being electrically connected to said second winding across said secondary winding, said second winding alternately increasing and decreasing the current flow in said first winding in rhythmic response to the dynamic characteristics of said magnetic amplifier, a second control circuit, said second control circuit being electrically connected to said third winding and said secondary winding, said first and second control circuits being alternately connected to said secondary winding, said third winding affecting current flow in said first winding in rhythmic response to the dynamic characteristics of said magnetic amplifier under operation of said machine out of synchronism with said source, said third winding alternately increasing and decreasing the current flow in said first winding in response to the static characteristics of said magnetic amplifier, said thermal relay under predetermined current flow therethrough controlling the actuation of said first breaker, said relay means upon predetermined energization thereof by said first winding controlling the current flow from said source through said thermal relay.

16. In combination, an alternating current machine having a primary winding and a secondary winding, a first circuit breaker connecting said primary winding to a source of electric power, a second circuit breaker connected to said secondary winding, a thermal relay electrically connected to said first breaker, a relay means electrically connected to said second breaker for actuating said second breaker, means for closing said first breaker to cause a current to flow from said source through said first breaker to said relay means, said thermal relay and said relay means being responsive to predetermined cycles of current flow and average of current flow, a magnetic amplifier comprising first, second, third and fourth windings mounted on a magnetic core, said first winding being connected in series with said thermal relay, a first control circuit, said first control circuit being electrically connected to said second winding across said secondary winding, said second winding alternately increasing and decreasing the current flow in said first winding in rhythmic response to the dynamic characteristics of said magnetic amplifier, a second control circuit, said second control circuit being electrically connected to said third winding and said secondary winding, said first and second control circuits being alternately connected to said secondary winding, said third winding affecting current flow in said first winding in rhythmic response to the dynamic characteristics of said magnetic amplifier under operation of said machine out of synchronism with said source, said third winding alternately increasing and decreasing the current flow in said first winding in response to the static characteristics of said magnetic amplifier, a third control circuit comprising a plurality of control circuit current amplifying devices, said third control circuit being electrically connected to said fourth winding across said secondary winding, said fourth winding affecting current flow in said first winding to modify the average value of the current flow in said first winding substantially as a function of the frequency of said third control circuit, said thermal relay upon predetermined current flow therethrough controlling the actuation of said first breaker, said relay means upon predetermined energization thereof by said first winding controlling the current flow from said source through said thermal relay.

References Cited in the file of this patent

UNITED STATES PATENTS 2,802,161   Reagan et al. _____ Aug. 6, 1957